Dec. 29, 1964   R. W. BRANDT, JR   3,163,458
TREE CLAMP WITH VIBRATORY MECHANISM AND FRAME
Filed April 9, 1962   4 Sheets-Sheet 1

INVENTOR.
RICHARD W. BRANDT JR.
BY
Munn & Liddy
ATTORNEYS

Dec. 29, 1964 R. W. BRANDT, JR 3,163,458
TREE CLAMP WITH VIBRATORY MECHANISM AND FRAME
Filed April 9, 1962 4 Sheets-Sheet 2
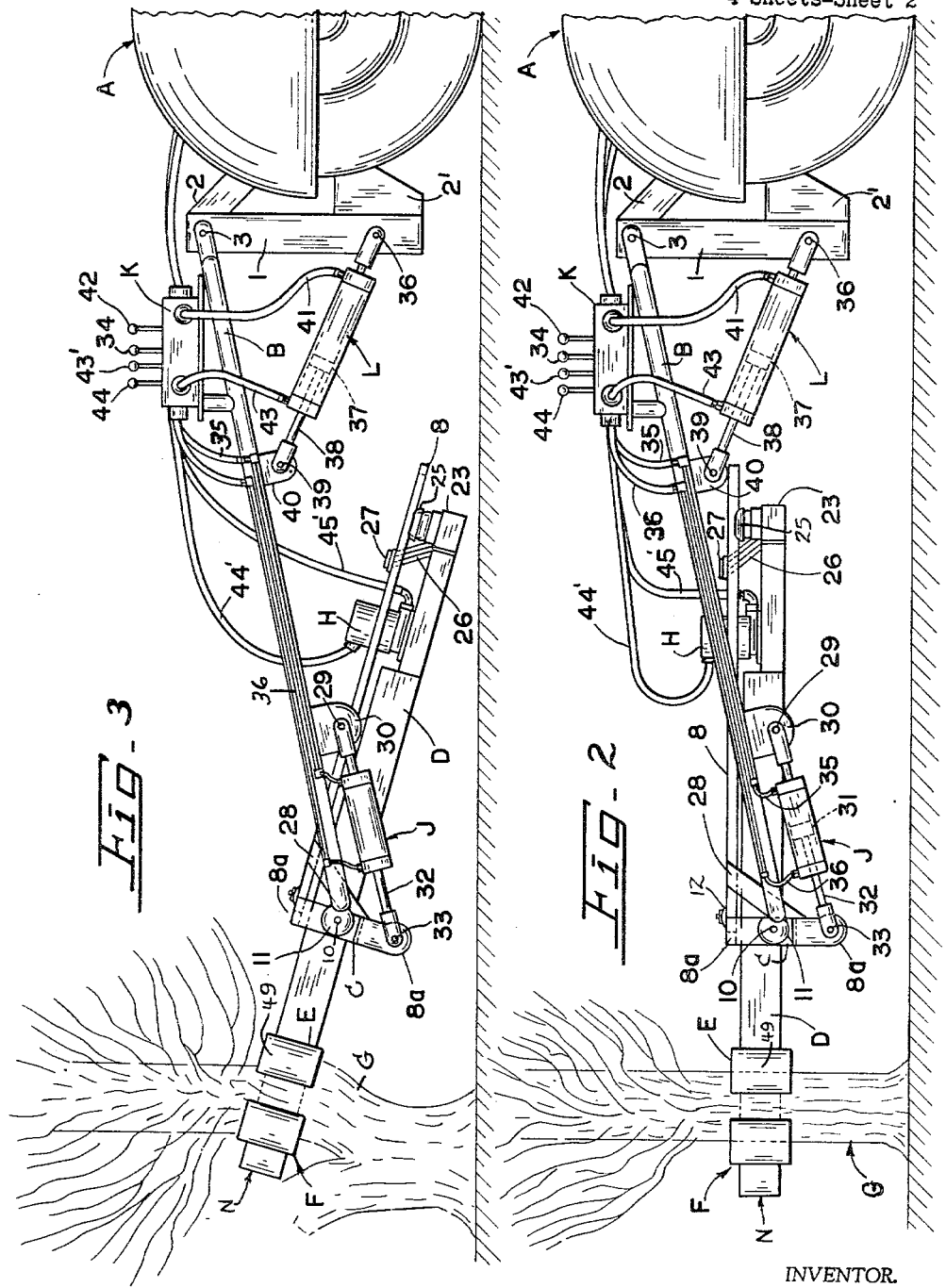
INVENTOR.
RICHARD W. BRANDT JR.
BY
Munn & Liddy
ATTORNEYS

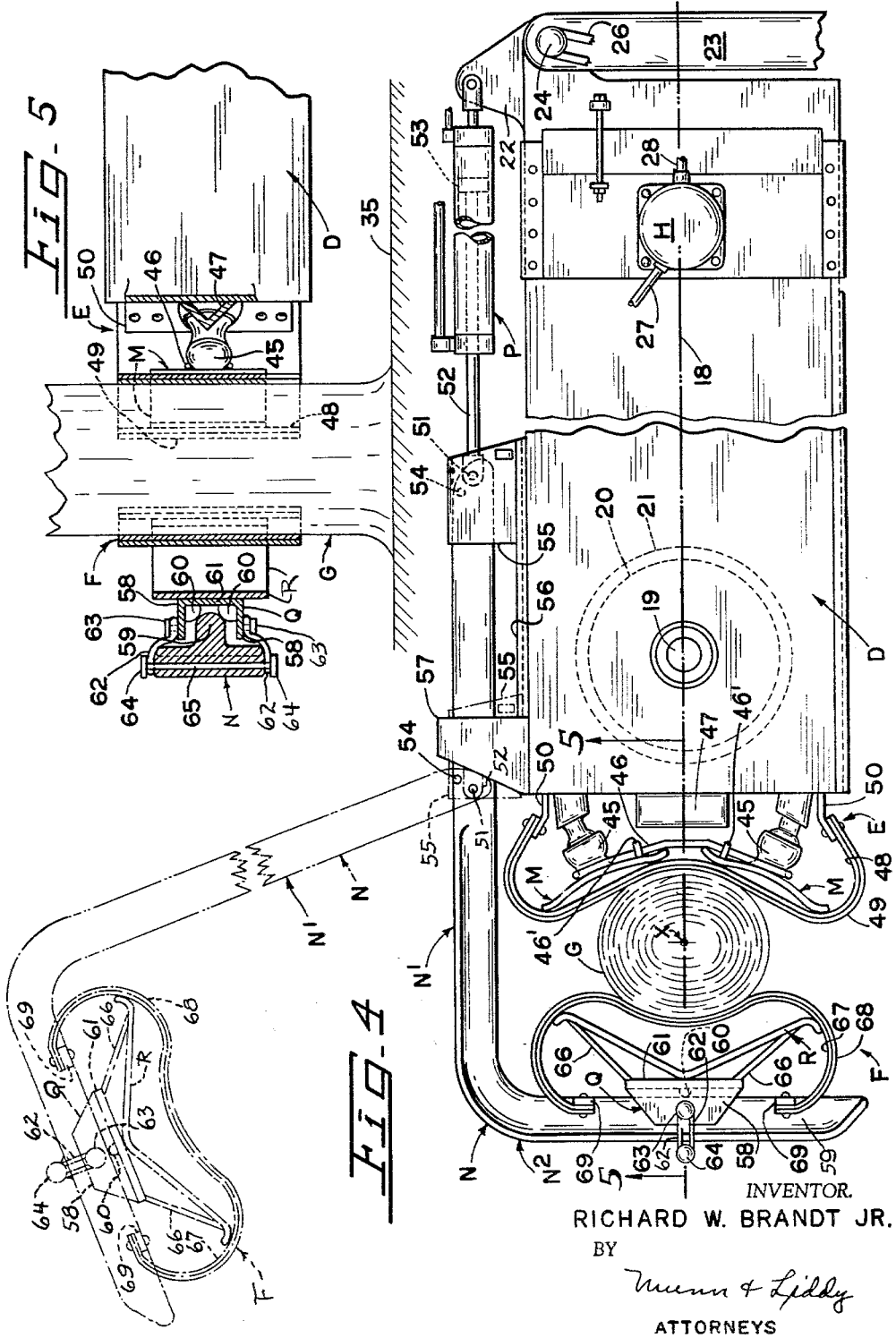

Dec. 29, 1964     R. W. BRANDT, JR     3,163,458
TREE CLAMP WITH VIBRATORY MECHANISM AND FRAME
Filed April 9, 1962     4 Sheets-Sheet 4
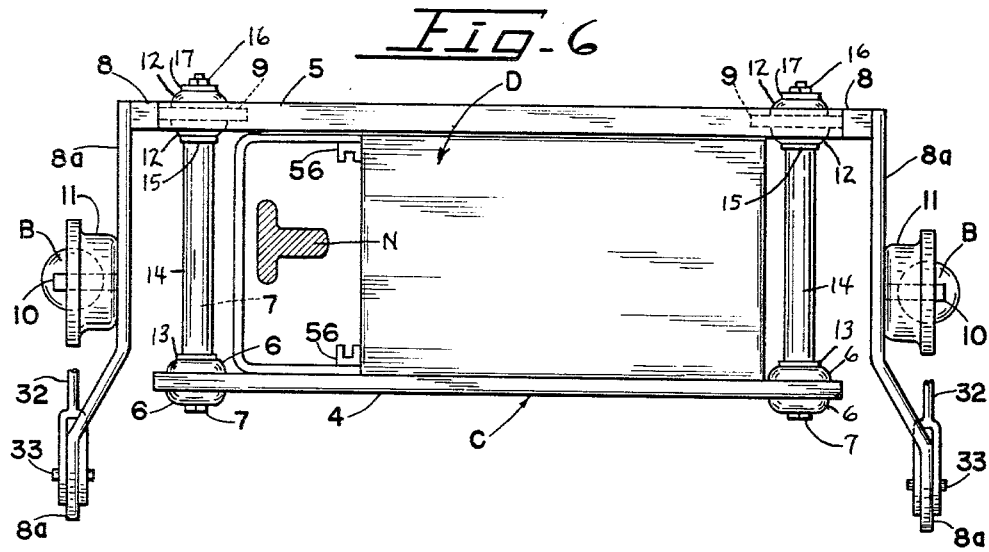
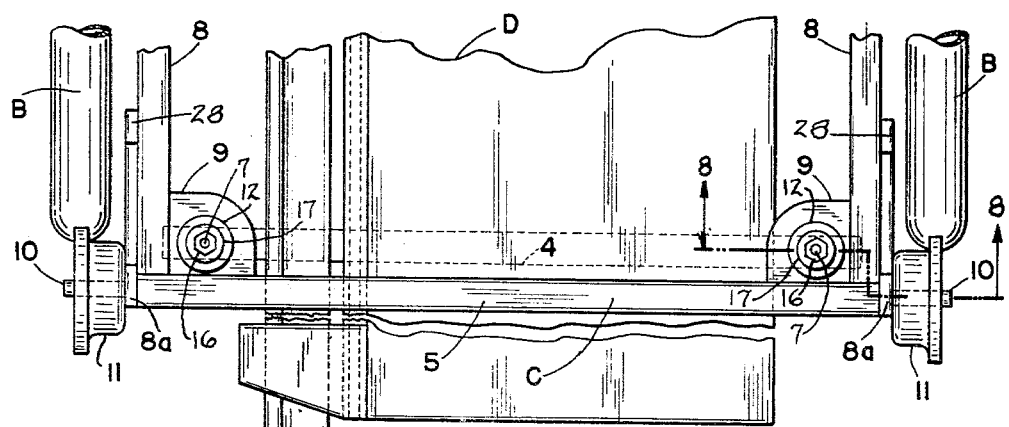
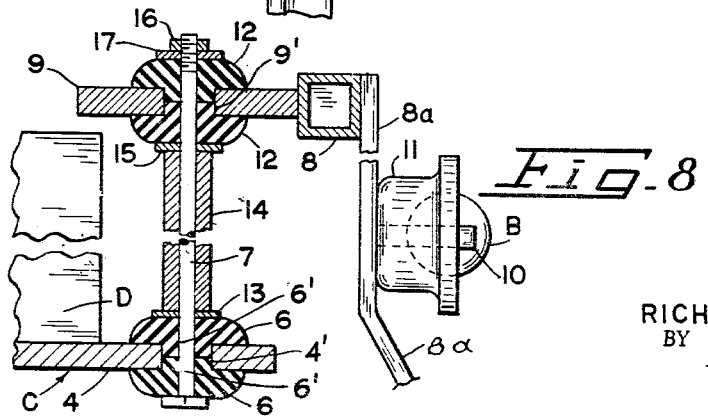
INVENTOR.
RICHARD W. BRANDT JR.
BY
Munn & Liddy
ATTORNEYS

United States Patent Office 3,163,458
Patented Dec. 29, 1964

3,163,458
TREE CLAMP WITH VIBRATORY MECHANISM AND FRAME
Richard W. Brandt, Jr., P.O. Box 253, Brownsville, Calif.
Filed Apr. 9, 1962, Ser. No. 186,258
10 Claims. (Cl. 294—88)

The present invention relates to improvements in a tree clamp with vibratory mechanism and frame and it consists in the combinations and arrangement of parts hereinafter described and claimed.

In my copending application on a belt drive for a shaking device, Serial No. 186,194, filed April 9, 1962, I disclose and claim the novel mechanism for vibrating the shaking device. I make use of that belt drive shaking device in the present invention.

An object of my invention is to mount the belt drive vibratory mechanism in a housing and equip the housing with a tree clamp of novel construction. The tree clamp has a jaw carried by the housing and the jaw includes a pair of plates with a universal joint connecting each plate to the housing. The jaw also includes one or more flexible strips that overlie the plates and have their ends connected to the housing. The purpose is to permit the flexible strip of the jaw to contact the tree when the clamp grips it and the universal joints will permit the plates to swing to the proper angle when pressing the strip against the tree. There can be movement between the plates and the strip during the contacting of the jaw with the tree and the plates and strip will adjust to the irregular contour of the portion of the tree contacted without marring the bark of the tree because there will be no slippage between the strip and the bark. The tree clamp can engage with the tree trunk or a branch or some other part of the tree prior to shaking the tree.

The tree clamp has a second jaw that is carried by an arm that is swingably supported by the housing. Hydraulic means are used for swinging the arm for about 180° for freeing the second jaw from the tree. The second jaw makes use of a concave member that can shift laterally or swing in any direction within predetermined limits so that the concave member will automatically position itself properly to grip the tree regardless of the contour of the portion gripped. Again a flexible strip is interposed between the concave member and the tree so that there will be no movement between the strip and the tree bark and any necessary movement will be between the concave member and the strip. One or more such flexible strips may be used and the ends of the strips are secured to the arm.

A further object of my invention is to provide a device of the type described in which the vibratory housing is connected to a powered vehicle such as a tractor in such a way that the housing can be moved vertically and inclined at a desired angle for causing the jaws of the tree clamp to engage with the trunk or other part of the tree for shaking it and cause fruit to drop from its branches. The suspension of the housing is such that the vibration of the housing when shaking a tree is not transmitted to the powered vehicle. Hydraulic means are used for moving the housing into the desired position, in actuating the tree clamp for gripping a tree and in operating a hydraulic motor for actuating the vibrating mechanism for vibrating the clamp and tree. The vibrating mechanism could be one of the forms shown in my copending application on a mechanical movement, Serial No. 78,347, filed December 27, 1960, but I prefer to use the belt drive mechanism shown in my copending case, Serial No. 186,194, because this form is less bulky and weighs less, and the frequency of vibration can be made much higher with belt drive than with a gear drive.

Other objects and advantages will appear as the specification continues. The novel features of the invention will be set forth in the appended claims.

Drawings

For a better understanding of my invention, reference should be made to the accompanying drawings, forming part of this specification, in which:

FIGURE 2 is a side elevation of FIGURE 1;

FIGURE 3 is a side elevation of the device but shows the tree clamp and associate vibratory housing in an inclined position so that the clamp can grip the tree at an angle;

FIGURE 4 is a top plan view of the tree clamp shown on a larger scale and the figure illustrates the movable and swingable jaw in a partially open position by dot-dash lines;

FIGURE 5 is a longitudinal section taken along the line 5—5 of FIGURE 4 and illustrates the stationary and movable jaws gripping a tree trunk;

FIGURE 6 is an enlarged transverse section taken along the line 6—6 of FIGURE 1 and shows how the vibratory housing is connected to a supporting frame that in turn movably connects the housing to the tractor;

FIGURE 7 is a top elevation of the portion of the device shown in FIGURE 6; and

FIGURE 8 is an enlarged vertical section through a part of the device and is taken along the line 8—8 of FIGURE 7.

Detailed Description

Figure 1:
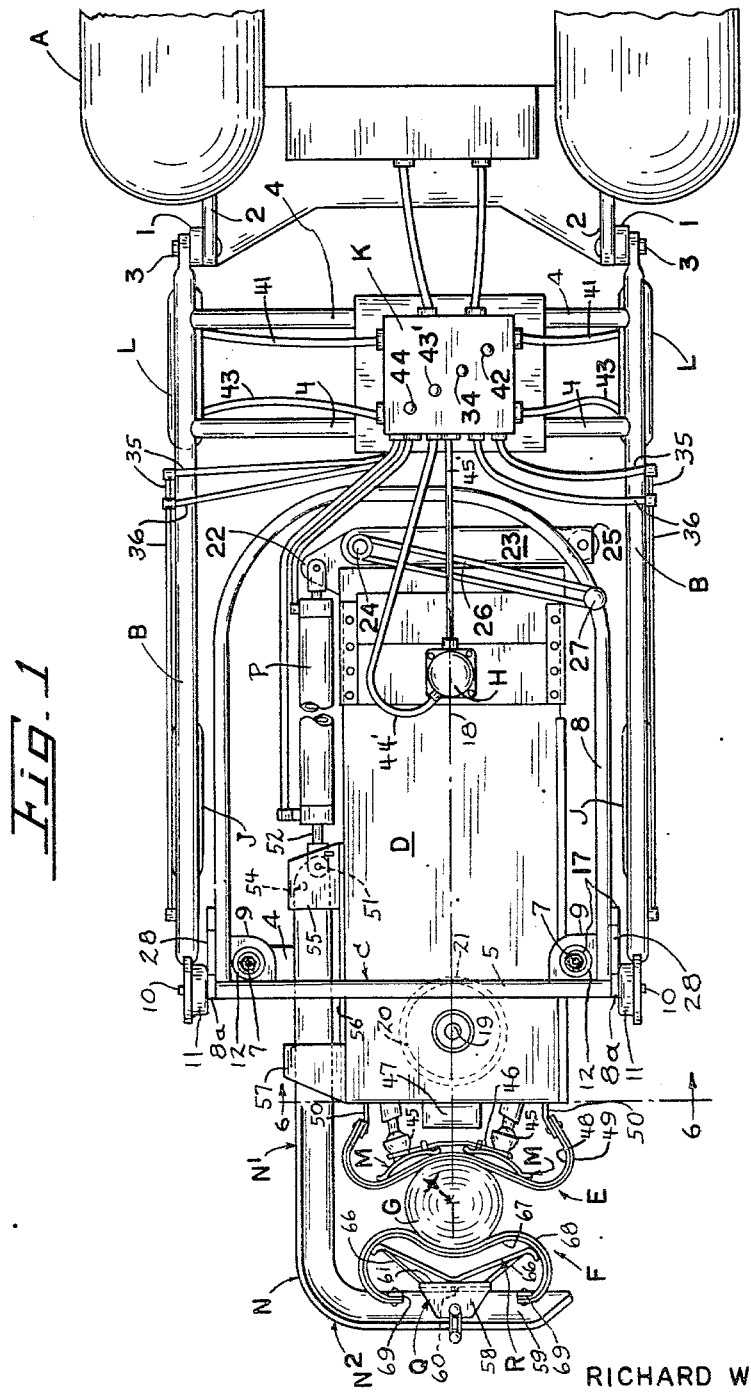
FIGURE 1 is a top plan view of the tree clamp and vibratory housing and shows the housing operatively connected to a tractor.

In carrying out my invention I show the tree clamp E, F in FIGURES 1 to 4 inclusive as being carried by a vibratory housing D and I further show how this housing is moveably secured to a tractor by a frame B so that the housing D and tree clamp E, F can be moved as a unit into different desired positions to cause the tree clamp E, F to engage with a tree trunk G or other portion of a tree at the proper position for shaking the tree. In my copending application on a Belt Drive for Shaking Device, Serial No. 186,194, filed April 9, 1962, I illustrate, describe and claim the particular belt drive mechanism 19, 20 and 21, see FIGURE 4, for causing the vibratory housing D to vibrate. In the present device I make use of the belt drive mechanism 19, 20 and 21, shown in FIGURE 4 and illustrated and described in my copending application and I attach the vibratory housing D to a tractor A in a manner now to be described. Further more I mount one of the tree-clamping jaws E at one end of the vibratory housing D and I mount the other jaw F on the swingable and movable arm N that is carried by the vibratory housing D.

In FIGURES 1, 2 and 3, I make use of a tractor or other powered vehicle as indicated generally at A and this tractor supports a pair of vertical members 1 that are spaced from each other as shown in FIGURE 1 and are connected to the tractor by upper connecting members 2 and lower connecting member 2'. A pair of elongated arms B have their right hand ends when looking at FIGURES 2 and 3, pivotally connected at 3 to the tops of the spaced apart vertical members 1. The arms B are interconnected by cross members 4, see FIGURE 1, and these cross members also act as reenforcing members for the two arms. Any type of reenforcement can be used to interconnect the two arms and have them swing as a unit about the pivots 3.

At the free ends of the two swingable arms B, I provide a support C for one end of the vibratory housing D, see FIGURES 6, 7 and 8. The support C includes a bottom bar 4 that is welded or otherwise secured to the underside of the vibratory housing D. The bottom bar 4 is connected to a top bar 5 by two supports including the side bolts 7 and other associate structure shown in FIGURE 6 and one of these supports is shown in cross section in FIGURE 8. The bottom bar 4 has an opening 4' near each end and FIGURE 8 shows one of the openings 4' receiving a pair of rubber grommets 6, that in turn have aligned openings 6' for receiving the shank of a supporting bolt 7. The top bar 5 has its ends connected to the ends of a U-shaped member 8 and ears 9 are welded at the corners provided by the top bar with the ends of the U-shaped member. Before describing the remainder of the structure interconnecting the bottom bar 4 with the top bar 5, it is best to state that the ends of the U-shaped member 8 have depending bars 8a provided with integral trunnions 10 that extend parallel with the longitudinal axis of the top bar 5 and are received in bearings 11, that in turn are welded to the free ends of the swingable and parallel arms B, see FIGURES 6, 7 and 8.

Each ear 9 has an opening 9' for receiving a pair of rubber grommets 12, see FIGURE 8, that in turn have aligned openings for receiving the shank of the bolt 7. A washer 13 receives the bolt 7 and bears against the upper grommet 6. A pipe 14 encloses a portion of the bolt 7 and rests on the washer 13. Another washer 15 receives the bolt 7 and bears on the top of the pipe 14. The bolt 7 has a threaded end projecting above the top grommet 12 and a nut 16 is mounted on the threaded bolt portion and forces a washer 17 down upon the top grommet 12. The structure is such as to support the bottom bar 4 and absorb the vibratory movement of the housing D during the operation of the device. The rubber grommets 6 and 12 will absorb the vibratory movement of the bottom bar 4 as this bar is moved by the casing D because it is welded thereto.

The vibratory housing D carries a tree-engaging jaw E which is mounted at one end of the housing and will be presently described in detail. A moveable and swingable jaw F cooperates with the jaw E to grip a tree trunk G therebetween as shown in FIGURE 1. A detailed description of the jaw F will be given hereinafter. I provide yielding means for aiding in supporting the end of the vibratory housing D which is disposed opposite to the jaws E and F and for absorbing any transverse vibration to a longituinal axis 18 through the housing that intersects the axis of the shaft 19 that rotatably carries the two energy wheels 20 and 21, shown in dotted lines in FIGURE 1. My copending application Serial No. 186,194 illustrates and describes how each energy wheel 20 and 21 carries an eccentric weight, not shown, and how the wheels are rotated in opposite directions at a high speed about the shaft 19 by a hydraulic motor H. An endless belt drive, not shown, and drive and idler pulleys, not shown, operatively connect the motor to the energy wheels that vibrate the housing D.

The difference between the diameters of the two energy wheels 20 and 21 is exaggerated in FIGURE 4 for purposes of clarity. In actual practice the difference between the diameters of the two wheels is about one one-hundredth of the diameter. I do not wish to be confined to this exact figure. This slight variation in the diameters of the two energy wheels produces a very high vibration that is transmitted to the housing D and to the jaws E and F for shaking the tree gripped by the jaws.

An ear 22 is carried by one corner of the housing D that is opposite to the end carrying the jaws E and F, see FIGURE 1. An anti-torque arm 23 has one end pivoted to the ear at 24 and its other end is pivoted to a bracket 25 that is secured to the U-shaped member 8. An elastic member 26 is connected to the pivot point 24 and to the U-shaped member 8 at 27. The portion of the axis 18 extending from the center X of the tree, through the axis of the shaft 19, and the anti-torque arm 23, resembles a lever action where the fulcrum is at the point X, with the short arm of the lever lying between the point X and the shaft 19 and the long arm of the lever extending from the point X to the torque arm 23 and its attachment to the U-shaped bar 8. The high frequency vibration created by the oppositely rotating energy wheels 20 and 21 is applied to the housing D in a lateral direction to the axis 18 at a point 19 that is near one end of the housing. The lateral vibration of the housing D is transmitted to the torque arm 23 which is a considerable distance from the shaft 19 where the vibration originates. Therefore the anti-torque arm 23 can dampen the vibrations of the housing D at the end opposite to the tree-clamping jaws E and F because of the long arm of the lever between the fulcrum X and the arm and litle vibration will be transmitted by the arm to the U-shaped member 8. The pin 24 is in reality a rubber grommet and so is likewise the connection 27. These two rubber grommets absorb the vibrations from the housing D and prevent them from being received by the U-shaped member 8. The elastic member 26 that extends from the pin 24 for the torque arm to the connection 27 on the U-shaped member 8 is for aiding in supporting the right hand end of the housing D in FIGURE 1, when the housing is tipped into angular positions. The depending members 8a are braced by inclined struts 28, see FIGURES 2 and 3. A hydraulic cylinder J is pivotally secured at 29 to a bracket 30 that is carried by the arm B. A piston 31 is slidably mounted in the cylinder J and a piston rod 32 extends from the piston and is pivotally connected at 33 to the lower end of the depending member 8a. There is a separate hydraulic cylinder J for each arm B.

When the piston 31 is moved to the left in the cylinder J, the piston rod 32 will move to the left in FIGURE 2 and will act on the lower end of the depending member 8a to swing the housing D about the trunnions 10 in the bearings 11 in a clockwise direction. FIGURE 3 shows the housing D swung into a different position. FIGURES 1, 2 and 3 illustrate a master control valve K with a lever 34 for feeding a liquid under pressure through a conduit 35 to the right hand end of the cylinder J for rotating the housing D clockwise in the bearings 11, when the lever is moved in one direction. The opposite rotation of the housing D takes place when the lever 34 is swung in the opposite direction because fluid will flow through the conduit 36 to enter the left hand end of the cylinder J and the fluid in the right hand of the cylinder will flow back to the master control valve K through the conduit 35. I do not want to be limited to any particular hydraulic control for the two cylinders J for rotating the housing D in either direction.

It is also possible to swing the parallel arms B and position the housing D at any desired height above the ground within the limits of the machine. Any means for swinging the arms B may be used. I show a pair of hydraulic cylinders L that are pivoted at 36 to the uprights 1, see FIGURES 2 and 3. A piston 37 is slidably mounted in each cylinder and a piston rod 38 extends from the piston and has its outer end pivotally connected at 39 to a bracket 40 which is secured to the arm B. A fluid conveying conduit 41 leads from the master control valve K to the right hand end of each cylinder L, when looking at FIGURES 2 and 3. A lever 42 on the master control valve K when moved in one direction will permit fluid to flow through the conduits 41 to move the pistons 37 and swing the arms B in a clockwise direction about their pivots 3 for raising the housing D. When the lever 42 is swung in the opposite direction, fluid will flow through another conduit 43 and will enter the left hand end of the cylinder L for returning the piston and permitting the housing D to be lowered. During this movement of the piston 37, the fluid in the right hand end of the cylinder L will be forced back into the master control valve K through the conduit 41.

It will be seen from FIGURES 2 and 3 that I mount the hydraulic motor H on the vibratory or shaker housing D and this motor operates the drive pulley, not shown, and the energy wheels 20 and 21 which vibrate the shaker housing D. When a lever 43' on the master control valve K is actuated, fluid will flow from the master control valve through a conduit 44' to the hydraulic motor H and a return conduit 45' conveys the fluid from the hydraulic motor back to the master control valve. The hydraulic motor H will be actuated and will in turn actuate the vibrating mechanism mounted in the shaker housing D and will cause this mechanism to vibrate the housing. I show a schematic hydraulic means for operating the movable jaw F when a lever 44 is actuated in a manner to be later described.

It is best now to describe the particular construction of the stationary jaw E and the movable jaw F. These are shown in greater detail in FIGURES 4 and 5. The stationary jaw E will first be described. The housing D carries two plates M that have a universal connection by a ball and socket joint 45 with the left hand end of the shaker housing D. An elastic member 46 interconnects the two plates M and yieldingly moves them toward each other so that they will remain in substantially the positions shown in FIGURE 4. The elastic member 46 is an endless elastic band that has its two looped ends extending around the ball and socket joints 45. Eyelets 46' secure the two sides of the endless elastic band 46 to the backs of the plates M. A stop member 47 is V-shaped in cross section, see FIGURE 5, and this stop member will prevent the plates M from swinging any further in the same direction after the plates contact the member. A pair of flexible strips 48 and 49 have their ends secured to the brackets 50 which in turn are carried by the left hand end of the shaker housing D. The two flexible strips 48 and 49 overlie the plates M.

These strips perform a very important function in that the outer strip 49 will contact with the tree trunk G and will permit the inner strip 48 to move slightly with respect to the outer strip during the movement of the outer strip into gripping engagement with the tree trunk. The inner strip 48 not only can move with respect to the outer strip, but it can also move with respect to the plates M. The plates M are free to swing on their universal joints 45 and they are made slightly concave in shape so as to conform with the curvature of the tree trunk during the actual engagement of the fixed jaw E with the trunk. When the stationary jaw E engages with the tree trunk G in FIGURE 4, the plates M will swing to a greater extent about their universal joints 45 so as to bring the concave portions of the plates into conformity with the substantially circular surface of the tree trunk. The two flexible strips 48 and 49 will also be forced into the concave portions of the plates M and a solid contact will be provided between the shaker housing D and the tree trunk. It should further be noted that if the tree trunk G does not extend in a true vertical line from the ground, see FIGURE 3, then the plates M can swing about their universal joints 45 as about horizontal axes and this will permit the plates M to adjust about horizontal axes as well as the vertical axes.

The movable jaw F includes an L-shaped arm N and this arm is pivotally mounted at 51 to a piston rod 52. The piston rod 52 is slidably mounted in a hydraulic cylinder P. A piston 53 is mounted on the rod 52 and is slidably received in the cylinder P. It should be noted that the inner end of the L-shaped arm N is pivoted at 54 to a slidable housing 55, see FIGURE 4. The housing 55 slides along a track 56 carried by the vibrator housing D, see FIGURES 4 and 6. When the piston 53 is moved to the left in the cylinder P, in FIGURE 4, it will move the piston rod 52 to the left and will cause the slidable housing 55 to move along the trucks 56 until the slidable housing is received in a U-shaped stirrup 57. The slidable housing will be brought to a stop when it reaches the dot-dash line position shown in FIGURE 4 and then further movement of the piston rod 52 to the left will cause the rod to swing the L-shaped arm N from the full line position in FIGURE 4 into the dot-dash line position shown in the same figure. The arm N can be swung further than that shown in FIGURE 4. In fact it can be swung until the movable jaw F is positioned in back of a line that is extended from the left hand end of the housing D. The arms B can be connected to the side of a tractor rather than at one end. This would permit the tractor to move between two rows of trees and the housing D to be moved from tree to tree. This permits the housing D to be moved at right angles to its length when the tractor moves the housing D from one tree G to the next tree in line. The housing D when extending from the side of the tractor A can be moved in substantially a straight line by the tractor from tree to tree which line is at right angles to the length of the housing D. The fully opened jaw F when swung so that the jaw lies in back of an extended line coinciding with the outer end of the housing D, permits such movement.

When the piston rod 52 is moved to the right in FIGURE 4, then the reverse movement of the L-shaped arm N will take place. Initially the arm N will swing about the pivot 54 until one leg N1 of the arm lies in a parallel relation with the length of the piston rod 52. Further movement of the piston rod 52 to the right will then cause the slidable housing 55 to move along the track 56 from the dot-dash line position into the full line position. During this movement the leg N1 of the arm will be moved into the U-shaped stirrup 57 and the stirrup will hold the leg N1 from any further swinging movement. The movement of the piston rod 52 continues to the right in FIGURE 4 until the movable jaw F engages with the tree trunk G.

The movable jaw F which is carried by the swingable arm N, will now be described. The arm N is T-shaped in cross section, see FIGURES 4 and 5. The movable jaw F comprises a U-shaped base member Q that is turned on its side and the sides 58 of the U are spaced above and below the horizontal sides of the central stem 59 of the arm N, see FIGURE 5. The U-shaped member Q has centrally disposed and integral lugs 60 placed at the inner corners formed by the juncture of the sides 58 meeting the web that interconnects the sides. The centrally disposed lugs 60 ride on the stem 59 of the arm N and permit the U-shaped base member Q to rock on a horizontal axis when looking at FIGURE 5 and within predetermined limits. The member Q can only rock a limited distance in one direction and then one of the sides 58 will have its edge engage with the arm N where the stem 59 has its juncture with the top of the T portion of the arm. Also the member Q can only rock a limited distance in the opposite direction and then the other side 58 will have its edge engage with the opposite side of the arm N where the stem 59 has its juncture with the top of the T portion.

It will be further noted from FIGURE 4 that the member Q can also rock on the lugs 60 about an axis that passes through the lugs 60 and substantially parallels the axis of the tree G. The web 61, see FIGURE 5, that interconnects the sides 58 of the member Q, is spaced from the bottom edge of the stem 59 of the arm N, and therefore the member Q can rock about a vertical axis that passes through the lugs 60. The member Q is adjustably held on the arm N by elastic members 62 that are connected to upper and lower buttons 63 carried by the sides 58 of the member Q and to upper and lower heads 64 provided on a bolt 65 that is carried by the arm N. The elastic members 62 will permit the member Q to shift laterally a short distance along the stem 59 and to have a slight swinging movement in both a horizontal and vertical planes as just described.

The U-shaped member Q has a shallow V-shaped plate R secured thereto, the vertex of the plate R being welded or otherwise secured to the outer surface of the web 61.

of the member Q. The member Q has also end bracing struts 66 that are integral with the member Q and are welded or otherwise secured to the plate R. I further provide a pair of flexible strips 67 and 68 for the plate R and the ends of these strips are connected to lugs 69 that are mounted on the arm N. The outer strip 68 contacts with the tree G when the movable jaw F engages with the tree. The inner strip 67 has smooth surfaces on both sides so as to permit the inner strip to slip on the outer strip 68 and to also slip on the plate R. This construction will not harm the bark of the tree while the plate R is being moved to engage with the tree and will be free to swing in both horizontal or vertical planes and to even shift along the arm N a slight distance if necessary.

I claim:
1. In combination:
 (a) a housing having an end;
 (b) a first jaw carried by said housing end including a pair of movably mounted plates;
 (c) a flexible strip overlying said plates and having its ends secured to said housing end;
 (d) an arm swingably carried by said housing;
 (e) a second jaw carried by said arm and including a concave plate swingably and movably mounted on the arm; and
 (f) a flexible strip overlying said concave plate and having its ends secured to said arm.
2. The combination as set forth in claim 1: and in which
 (a) said first-named jaw has at least two flexible inner, and outer strips arranged in contacting relation and having their ends secured to said housing end; said strips being free to slide one against the other with the inner strip being free to slide with respect to the first-mentioned movably mounted plates; and
 (b) said second concave jaw has at least two flexible inner and outer strips arranged in contacting relation and having their ends secured to said arm; said last-named flexible strips being free to slide one against the other with the inner strip being free to slide with respect to said second-named concave jaw.
3. In a device of the type described:
 (a) a jaw including a pair of plates;
 (b) a universal joint for supporting each plate;
 (c) a common support for both universal joints; and
 (d) a flexible strip overlying said plates in floating engagement therewith and having its ends secured to said common support.
4. The combination as set forth in claim 3: and in which
 (a) at least one additional flexible strip superimposed upon said first-named flexible strip and in sliding engagement therewith and with said pair of plates; said additional flexible strip having its ends secured to said common support.
5. The combination as set forth in claim 3, and in which
 (a) yielding means is connected to both of said pair of plates for tending to swing both plates into a position with respect to each other where the two plates will lie in a concave arc; and
 (b) a stop is carried by said common support and will limit further swinging of the two plates in the same directions when the plates contact with said stop.
6. In a device of the type described:
 (a) a jaw including a supporting arm T-shaped in cross section;
 (b) a member U-shaped in cross section and having a pair of lugs positioned midway between the ends of the member and arranged at the inner corners formed by the junctures of the sides of the U-shaped member and the common connecting portion; the lugs slidably engaging with central stem of the T-shaped arm and permitting the U-shaped member to rock thereon; the outer ends of the legs of the U-shaped member being adapted to contact with the sides of the T-shaped arm to limit the rocking movement thereof about the central stem of said arm; said legs of the U-shaped member also permitting said member to rock on said lugs about an axis at right angles to the length of said arm;
 (c) a concave member rigidly secured to the outer surface of the common portion of said U-shaped member that interconnects the two parallel legs of said member; the width of the concave member extending across the width of the common portion of said U-shaped member;
 (d) a flexible strip overlying the concave face of the concave member and having its ends connected to said arm; and
 (e) yielding means connecting the U-shaped member to the arm and permitting a sliding movement between the U-shaped member along the length of the arm and permitting a rocking movement of the U-shaped member in either of two directions at right angles to each other and with respect to the arm.
7. The combination as set forth in claim 6: and in which
 (a) at least one additional flexible strip is associated with said first-named flexible strip and slidably contacts therewith and with said concave member; said additional flexible strip having its ends secured to said arm.
8. In an object-gripping clamp:
 (a) a support;
 (b) a pair of object grippings jaws, each of said jaws carried by the same end of said support and adapted to be arranged on diametrically opposite sides of a cylindrical object, one of said jaws being pivotally connected to said support and spaced further from said end of said support than said other jaw;
 (c) a flexible strip loosely overlying said other jaw and having its ends secured to said support; and
 (d) means for moving the jaws toward one another for gripping the cylindrical object disposed therebetween.
9. In an object-gripping clamp:
 (a) a support;
 (a') an arm carried by said support;
 (b) a U-shaped member supported on said arm for universal movement with respect thereto;
 (c) elastic means having its ends connected to said arm and member and providing said member with a limited swinging movement with respect to said arm; and
 (d) an object contacting jaw supported by said member.
10. The combination as set forth in claim 9: and in which
 (a) a flexible strip is interposed between said jaw and the object; said strip sliding over the jaw more readily than over the object.

References Cited in the file of this patent
UNITED STATES PATENTS

| | | |
|---|---|---|
| 915,699 | Quinley | Mar. 16, 1909 |
| 1,807,360 | Wehr | May 26, 1931 |
| 2,685,775 | Gould et al. | Aug. 10, 1954 |
| 2,700,268 | Lowe | Jan. 25, 1955 |
| 2,727,325 | Jurinic | Dec. 20, 1955 |
| 2,807,495 | Pillstrom | Sept. 24, 1957 |
| 2,995,794 | Hacking | Aug. 15, 1961 |
| 3,011,821 | Doty | Dec. 5, 1961 |
| 3,051,979 | Parsons | Sept. 4, 1962 |